United States Patent
Pendse (10) Patent No.: US 9,819,741 B1
(45) Date of Patent: Nov. 14, 2017

(54) DEVICE FOR SENSOR SIMULATION USING CONSTRAINED APPLICATION PROTOCOL

(71) Applicant: Sudhir Pendse, Los Altos, CA (US)

(72) Inventor: Sudhir Pendse, Los Altos, CA (US)

( * ) Notice: Subject to any disclaimer, the term of this patent is extended or adjusted under 35 U.S.C. 154(b) by 321 days.

(21) Appl. No.: 14/737,208

(22) Filed: Jun. 11, 2015

Related U.S. Application Data (60) Provisional application No. 62/017,683, filed on Jun. 26, 2014.

(51) Int. Cl.
*H04L 29/08* (2006.01)
*H04L 29/06* (2006.01)
*G06F 17/30* (2006.01)

(52) U.S. Cl.
CPC ........ *H04L 67/12* (2013.01); *G06F 17/30864* (2013.01); *H04L 69/16* (2013.01); *H04L 69/18* (2013.01)

(58) Field of Classification Search
None
See application file for complete search history.

(56) References Cited

U.S. PATENT DOCUMENTS

| | | | | |
|---|---|---|---|---|
| 2007/0124126 A1* | 5/2007 | Lee | ...................... | G06F 17/5009 703/6 |
| 2010/0054234 A1* | 3/2010 | Moon | ................... | H04W 16/22 370/350 |
| 2014/0359131 A1* | 12/2014 | Seed | ..................... | H04L 47/125 709/226 |
| 2015/0195126 A1* | 7/2015 | Vasseur | ............... | H04L 41/5025 370/218 |
| 2015/0350018 A1* | 12/2015 | Hui | ........................ | H04L 47/11 370/254 |

OTHER PUBLICATIONS

Ludovici, Alessandro, Pol Moreno, and Anna Calveras. "TinyCoAP: a novel constrained application protocol (CoAP) implementation for embedding RESTful web services in wireless sensor networks based on TinyOS." Journal of Sensor and Actuator Networks 2.2 (2013): 288-315.*

* cited by examiner

*Primary Examiner* — Thomas Dailey

(57) ABSTRACT

The invention is useful in the field of IoT—the Internet of Things—, networked sensors, and most particularly sensors in a constrained network; data collection from such sensors and the management of such a constrained network. The invention provides a device to simulate a plurality of sensors in a constrained network, where such simulation enables data collection and network management, including associated hardware such as gateway devices. In an alternate embodiment, the invention provides for data input from actual sensors.

9 Claims, 9 Drawing Sheets

DEVICE FOR SENSOR SIMULATION USING CONSTRAINED APPLICATION PROTOCOL

RELATED CASES

This application claims priority from U.S. provisional 62/017,683, filed Jun. 26, 2014, by the same inventor, the entirety of which is incorporated by reference as if fully set forth herein.

GOVERNMENT FUNDING

None.

FIELD OF USE

The invention is useful in the field of IoT—the Internet of Things—, networked sensors, and most particularly sensors in a constrained network, data collection from such sensors and the management of such a constrained network.

BACKGROUND

As the popularity of sensors enabled with Internet connectivity grows, applications that communicate and manage these sensors will need to deal with large numbers of sensors. It has been estimated that in the Internet of Things (IoT), the number of Internet enabled sensors will grow to 26 billion units by 2020. Networking protocols to communicate with the Internet-enabled sensors are slowly getting standardized. One such networking protocol is Constrained Application Protocol, commonly abbreviated as "CoAP".

CoAP protocol is designed to allow for communication with sensors which have limited computing resources and deployed in an environment where network connectivity is intermittent. It includes support for multi-cast IP addressing and provides a mechanism for discovering the manageable resources supported by a sensor.

To ensure that the applications managing and communicating with these sensors can scale up to manage a large number of sensors, what is desirable is a means to create a simulated environment made of a large number of sensors without needing to physically have the sensors themselves. What is also desirable is for these simulated sensors to give responses back in a manner similar to the real sensors. What is also desirable is for the simulated sensors, over the passage of time, to change the responses returned, as would be the case with real i.e. actual physical sensors. What is also desirable is for the simulated sensors to be able to model different error scenarios and intermittent network connectivity.

BRIEF SUMMARY OF THE INVENTION

This invention provides a means of creating a simulated environment made up of thousands of sensors that respond to management application requests such as CoAP protocol requests. The invention further provides a mechanism to learn from real sensors and record their responses in a manner that can be used to simulate them. The invention also makes use of the multi-cast IP support in the CoAP protocol when learning to discover and learn from multiple real sensors. The invention further provides a means to poll real sensors multiple times and record their values to determine the way in which they change with the passage of time. The invention further provides a way to quickly duplicate a simulated sensor and make thousands of sensors. The invention further provides a way to interpret commands at runtime that change the sensor behavior and responses. The invention further provides a way to model various scenarios by making the simulated sensors respond in specific ways at specific times. The invention further provides a way to create intermittent network connectivity that is characteristic of constrained networks by simulating lossy sensor behavior.

The preferred embodiment of the invention comprises a computing device, with a network connection, said device including a central processing unit; at least one computer store containing data, said data comprising a) Sensor Data files, containing listing of URIs supported by CoAP and associated information; and b) Sensor Modeling files, said files containing Tcl scripts; c) computer implementable instructions, said instructions enabling the creation of a plurality of threads, where each said thread simulates at least one sensor, where said sensors run CoAP software, and where said instructions add IPv4/v6 addresses of said sensors to the TCP/IP stack on said computing device, and where each thread is bound to a UDP port; and where each thread contains a Tcl interpreter allowing scripts in said Sensor Modeling file to be interpreted so as to change said sensor behavior emulating actual sensor changes over time; and where the computer implementable instructions perform the additional steps of evaluating any initialization script, receiving requests, timer events or close notification, evaluating any closure scripts, and removing IPv4/v6 addresses and closing threads;

whereby the behavior of a constrained network of a plurality of sensors is obtained, thereby enabling management of performance aspects of the network and the characteristics of gateway devices.

In an alternate embodiment, the device receives data from actual sensors and stores the data in Sensor Data Files.

In another embodiment of the invention, the device includes a CoAP Simulator Learner Utility that sends multicast requests, lists sensors that respond, and queries each responding sensor so as to create multiple Sensor Data Files.

In an alternate embodiment of the invention, the Sensor Model files provide data sufficient to model errors, intermittent connectivity and lossy behavior.

DETAILED DESCRIPTION OF A PREFERRED EMBODIMENT

Definitions and abbreviations used herein. Applicant intends the common usage of terms used herein, and sets forth the below for avoidance of doubt: Actual sensor: a real sensor, i.e. not a simulated sensor.

CoAP means "Constrained Application Protocol", as described in RFC 7252. CoAP is the Constrained Application Protocol from the CoRE (Constrained Resource Environments) IETF group. Applicant intends that, while the discussion of the preferred embodiment will focus on CoAP, it is to be understood that the invention is not necessarily limited to CoAP but rather is inclusive of protocols for networking sensors, such as, for example MQTT. MQTT is a publish/subscribe messaging protocol designed for lightweight M2M communications. It was originally developed by IBM and is now an open standard.

CoAP server/sensor: any server or sensor running CoAP server software, in a constrained network and connected to a CoAP client or CoAP proxy or CoAP manager CoAP client: a proxy or management application Constrained network: a network in some or any expected characteristic of a Internet network may be intermittently or chronically unavailable. A network may be wired, wireless, using, for example connectivity through Bluetooth (over IEEE 802.15.1), ultra-wideband (UWB, over IEEE 802.15.3), ZigBee (over IEEE 802.15.4), and Wi-Fi (over IEEE 802.11)—four protocol standards for short-range wireless communications with low power consumption.
CPU: Central Processing Unit Gateway device: A gateway is a data communication device that provides a remote network with connectivity to a host network. A gateway device provides communication to a remote network or an autonomous system that is out of bounds for the host network nodes. Gateways serve as the entry and exit point of a network; all data routed inward or outward must first pass through and communicate with the gateway in order to use routing paths. Generally, a router is configured to work as a gateway device in computer networks.

IoT: Internet of Things; generally refers to the propagation of low power and lossy networks as sensor devices become ubiquitous and connected to the Internet.

pcap: packet capture

Sensor Data File: a file containing information, i.e. a list of URIs supported and associated information Sensor Modeling file: a file stored on the computing device running the constrained network simulations and containing data for modeling sensor behavior Tcl: Tool Command Language Tcl interpreter: tool command language interpreter TCP/IP: Transmission Control Protocol/Internet Protocol UDP: User Datagram Protocol URI: Uniform Resource Identifier Well known/core URI is part of the CoAP protocol: "Nell-known/core" is defined as a default entry point for requesting the list of links about resources hosted by the server.

The invention can be understood by the below discussion of the drawings.

Figure 1:
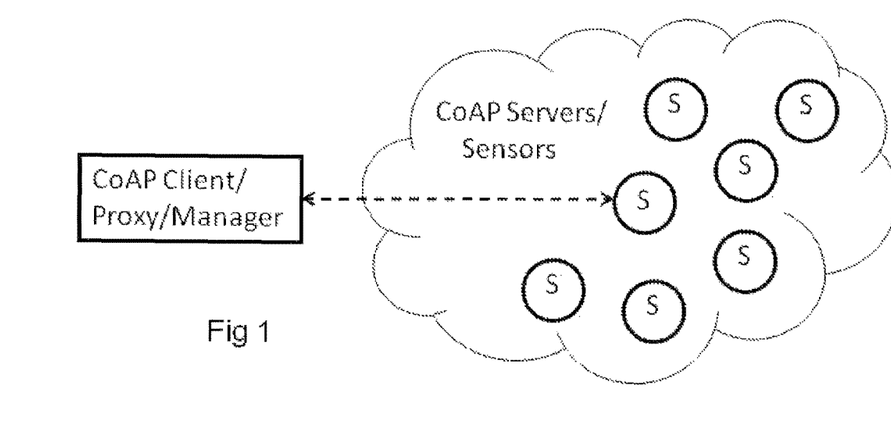
FIG. 1 represents a large number of real sensors running CoAP server software located within a constrained network communicating with a CoAP client such as a Proxy application or a Management application
Figure 2:
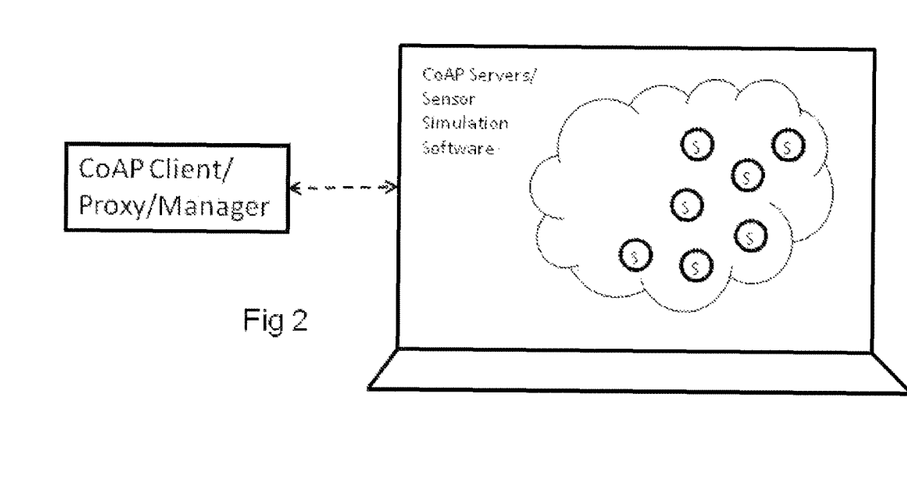
FIG. 2 represents a software based simulator that simulates a large number of sensors while running on one computer, according to the invention.

FIG. 1 represents a large number—hundreds, thousands or tens of thousands—of real sensors—"S"—running CoAP server software located within a constrained network 10 communicating 15 with a CoAP client 20, where the client is a Proxy application or a Management application. In order to develop, test, and support management applications or proxies without having access to hundreds of actual sensors, it is useful to have a software based simulator that simulates a large number of sensors while running on one computer, as represented in FIG. 2. Referring now to FIG. 2, the invention 200 provides a computing device with a CPU 201 performing, by executing steps written in computer code, a simulation of a constrained network containing a plurality of sensors in order to test a client 20, that is to say, management application protocols.

Figure 3:
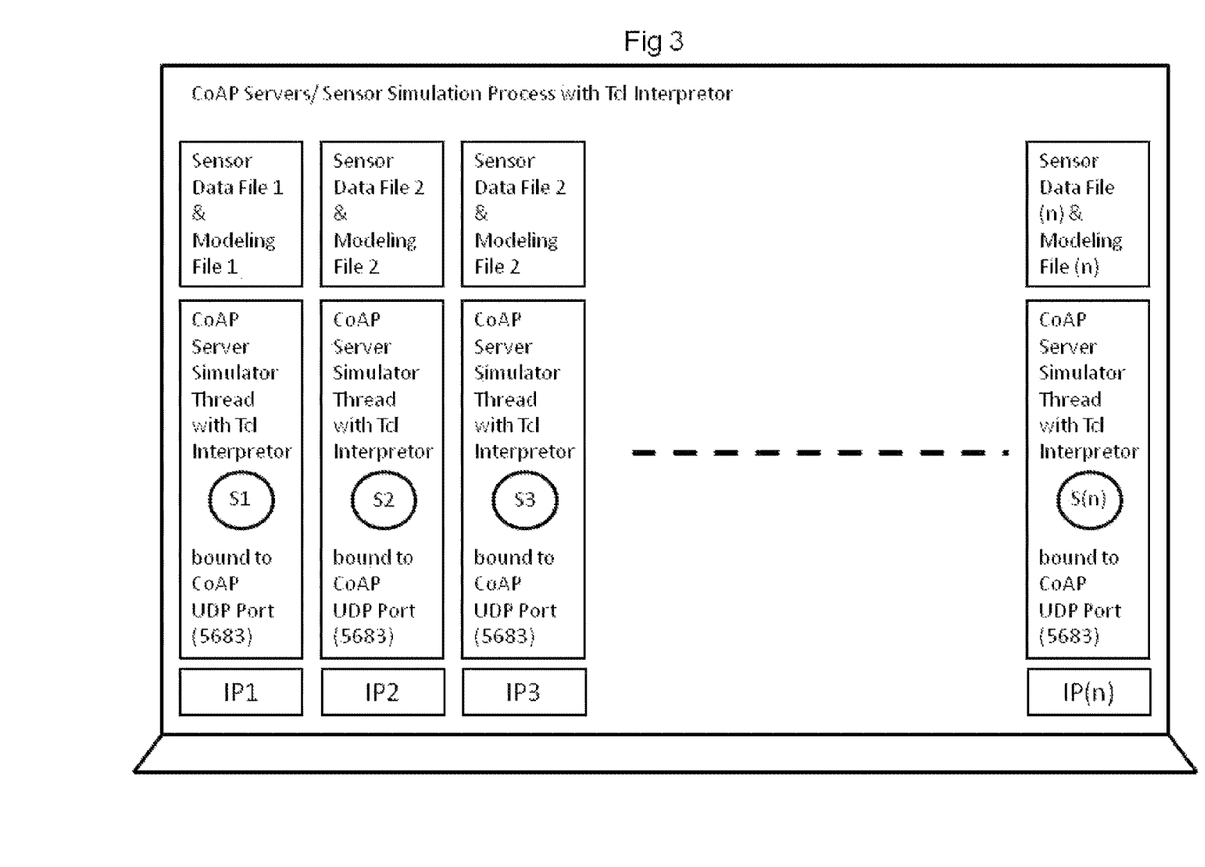
FIG. 3 shows the software architecture of a simulator as in FIG. 2

FIG. 3 depicts the software architecture of a simulator according to the invention, with <n> number of software threads running on one computer, simulating <n> sensors running CoAP server software. The simulation software uses multi-homed IP to add IPv4/v6 addresses of the simulated sensors to the underlying TCP/IP stack on the computer running the software as shown by IP1, IP2 . . . IP(n). It then starts <n> threads each bound to CoAP specific UDP port (like 5683 or Secure CoAP port) and listening for requests. When requests come in, they are processed based in the information in the associated Sensor Data file and Sensor Modeling file and a response generated as per the requirements of the CoAP protocol. Each sensor simulation thread also includes a Tcl (Tool Command Language) interpreter that allows scripts in the Sensor Modeling File or user specified scenarios to be interpreted, and consequently that can change the data and the behavior of the sensor in real time. Each sensor either has its own different Sensor Data File and Sensor Modeling File (see S1 and S2) or shares the same one with others (see S2 and S3). The simulator process also includes a Tcl interpreter that evaluates scripts and orchestrates actions by all sensors and threads.

Figure 4:
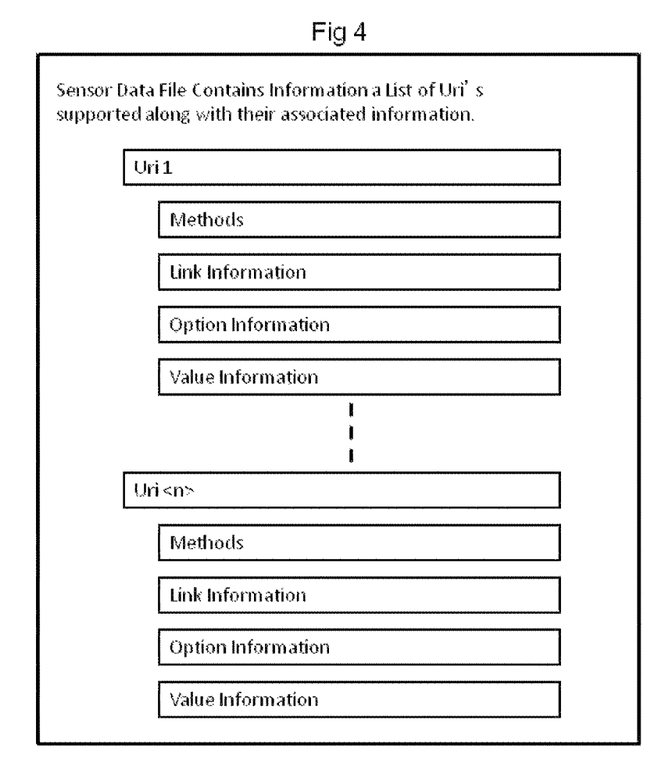
FIG. 4 shows a Sensor Data file containing the list of URI (Uniform Resource Identifier)'s supported by the CoAP server along with their associated information like which methods (get, put, post, delete) are supported, link information, option information and value information

Referring now to FIG. 4, the Sensor Data File contains the list of URIs (Uniform Resource Identifiers) supported by the CoAP server along with their associated information such as which methods are supported (e.g. get, put, post, delete), link information, option information and value information. Upon commencing a simulation using a device according to the invention, information from the Sensor Data File is loaded into the simulator, and Sensor Data File information can be subsequently modified via Tcl scripts. Value information in the Sensor Data File also contains information as to how the value changes with time. Various built-in value types provide dynamism for the values returned for the requests. In an alternate embodiment, specific predefined lists of values along with time delays are provided to specify how the value changes with time.

Figure 5:
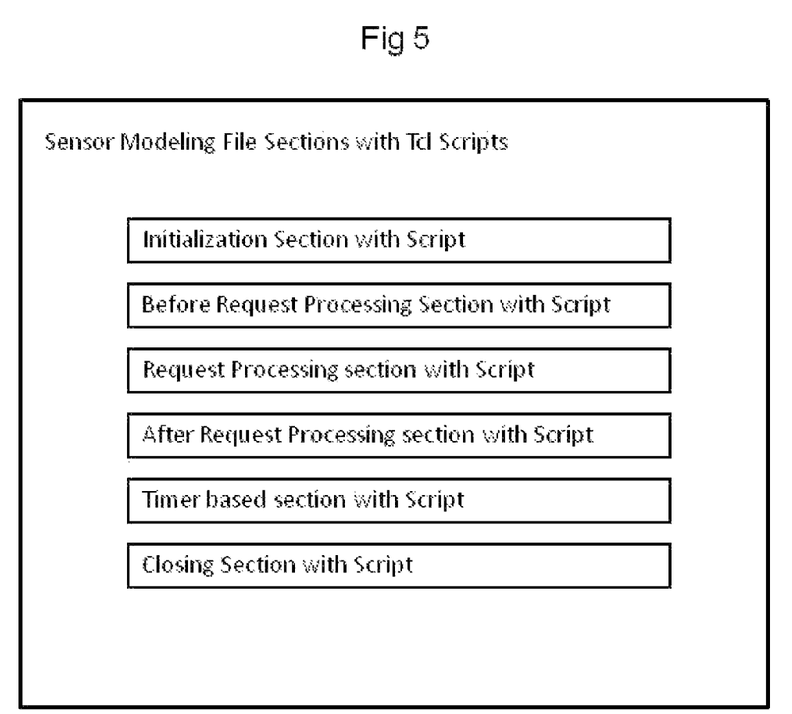
FIG. 5 shows a Sensor Modeling File containing one or more sections with the associated Tcl script for interpretation

Referring now to FIG. 5, the Sensor Modeling File, when present, contains one or more sections with the associated Tcl script for interpretation. The initialization section contains scripts that are interpreted when the simulated sensor is first started. The Before Request processing section contains scripts that can be interpreted before a specific request containing a specific method for a specific URI is processed using the Sensor Data File information. The Request processing section for a specific method for a specific URI, if present, is interpreted to create the response, and the information in the data file is ignored. The After Request processing section contains scripts that can be interpreted after a specific request containing a specific method for a specific URI is processed using the Sensor Data File information. The Timer section contains scripts that can be interpreted on a periodic basis. The Closing section contains scripts that are interpreted when the simulated sensor is stopped.

Figure 6:
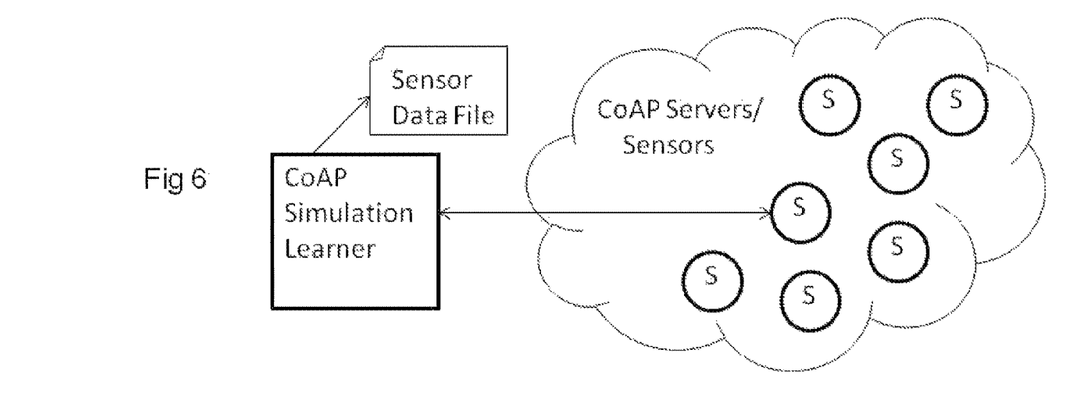
FIG. 6 represents the CoAP Simulation Learner saving all "learned" information in the Sensor Data File.
Figure 7:
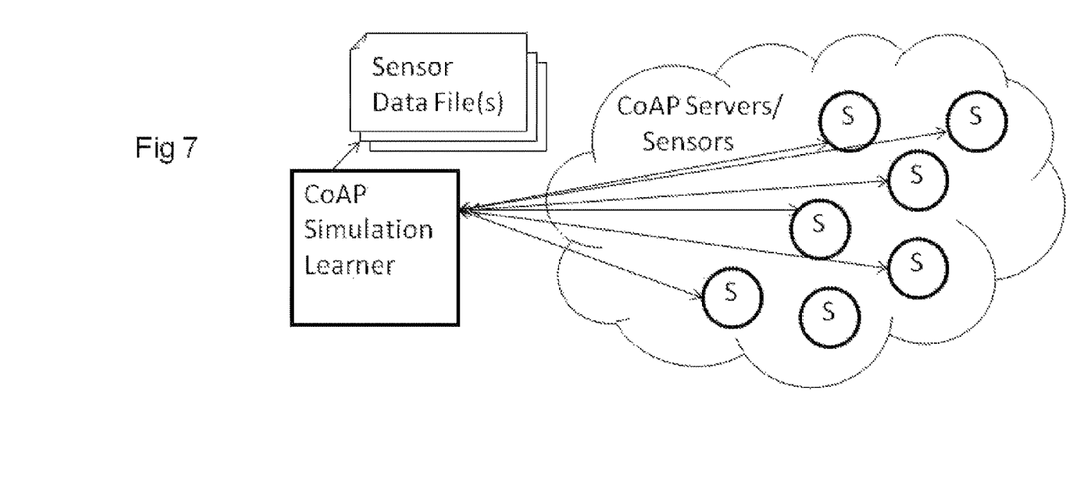
FIG. 7 represents the CoAP simulation Learner utility sending multi-cast request and gathering a list of sensors that respond, and then querying each responding sensor to create multiple Sensor Data Files

In one embodiment of the invention, the Sensor Data File is created by "Learning" from an actual sensor. The CoAP Simulation Learner Utility communicates with the real sensor and queries it to get a list of supported URIs using the CoAP discover mechanism of retrieving information for the/well-known/core URI. Then for each URI returned in the response, it sends an explicit "get" request and gets its value. In this embodiment, the CoAP Simulation Learner Utility also "observes" each of the retrieved URIs for a specific interval of time and records the changes in the values. FIG. 6 represents the CoAP Simulation Learner saving all the information "learned" in the Sensor Data File. FIG. 7 represents that the CoAP simulation Learner utility also sends multi-cast request, gathers a list of sensors that respond, and then queries each responding sensor to create multiple Sensor Data Files as shown in FIG. 7.

Figure 8:
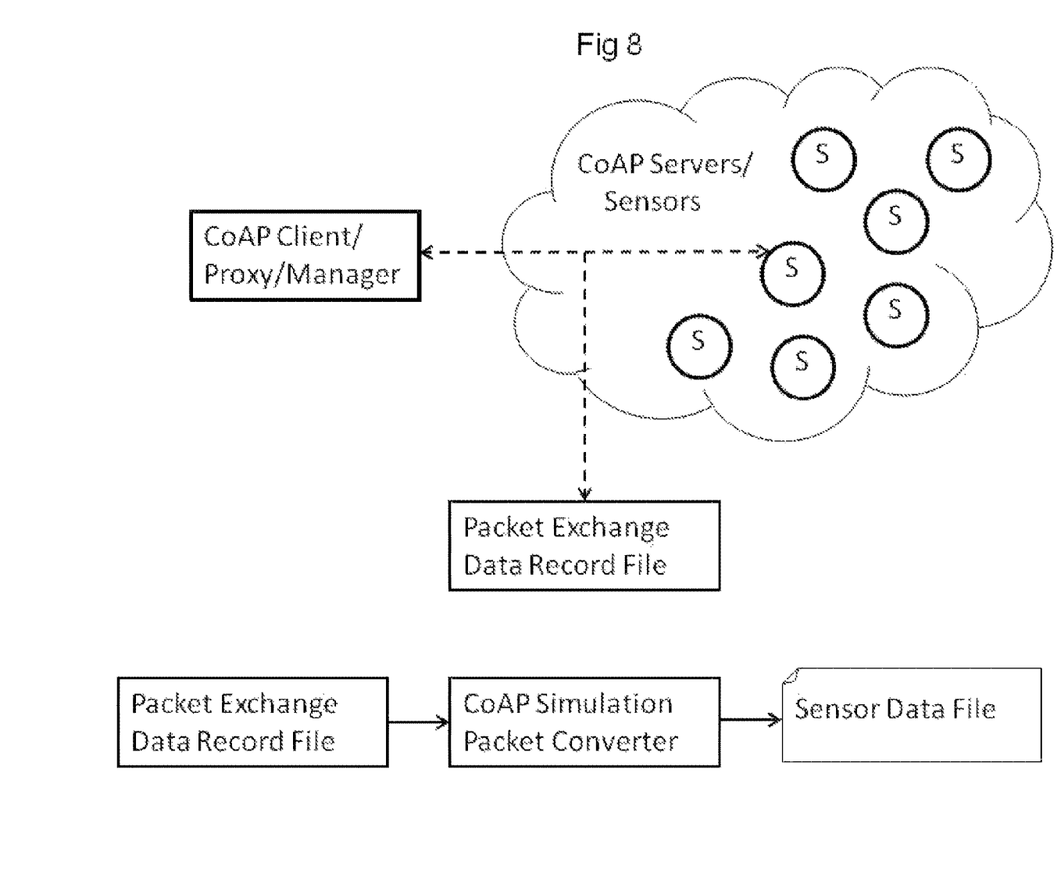
FIG. 8 represents an unencrypted packet exchange between the CoAP client Proxy/Manager and the real sensor is captured in a standard packet capture file format like pcap; the CoAP simulation packet converter utility examines the packets inside the packet capture file and create the Sensor Data file with information gathered from the packet interaction

If the unencrypted packet exchange between the CoAP client Proxy/Manager and the real sensor is captured in a standard packet capture file format such as pcap, then the CoAP simulation packet converter utility examines the packets inside the packet capture file and create the Sensor Data File with information gathered from the packet interaction as shown in FIG. 8.

Figure 9:
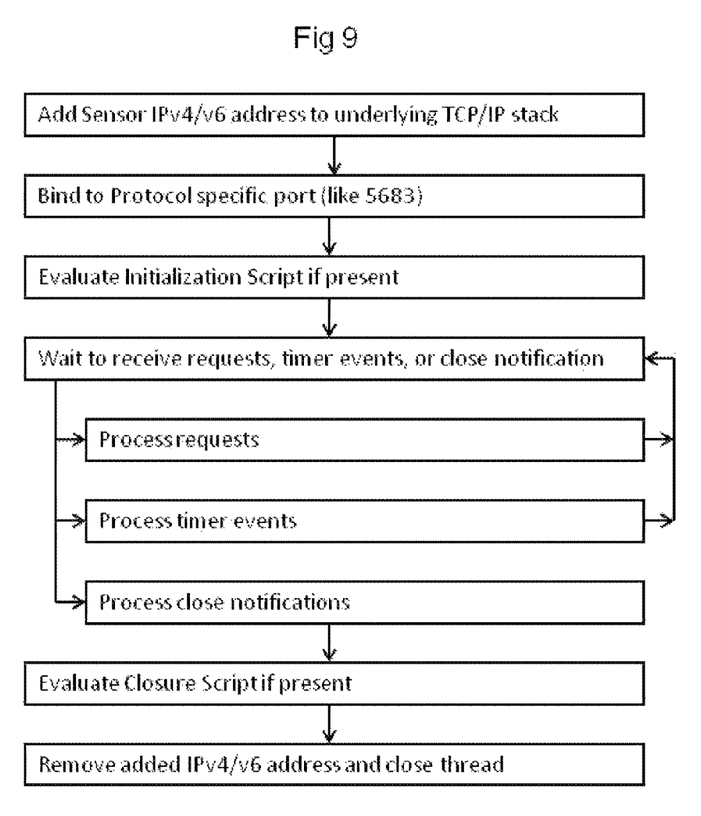
FIG. 9 is a Simulation CoAP Server Thread Processing Flow chart according to the invention

Referring now to FIG. 9, to simulate a CoAP Server sensor, the simulation software in a device according to the invention first adds the IP address (v4 or v6) of the sensor to the underlying TCP/IP stack on the computer, and then starts a thread that is listening for incoming packets on a particular UDP port (like 5683 or the Secure CoAP port). It also evaluates the initialization script if present, after which it waits to receive requests, process timer events, or close simulation requests. In case of close simulation requests, it closes the sockets that it is listening on, evaluates the close simulation script if present, removes the IP address added and closes the thread. FIG. 9 presents an overview of the processing steps preformed by a device according to the invention.

Figure 10:
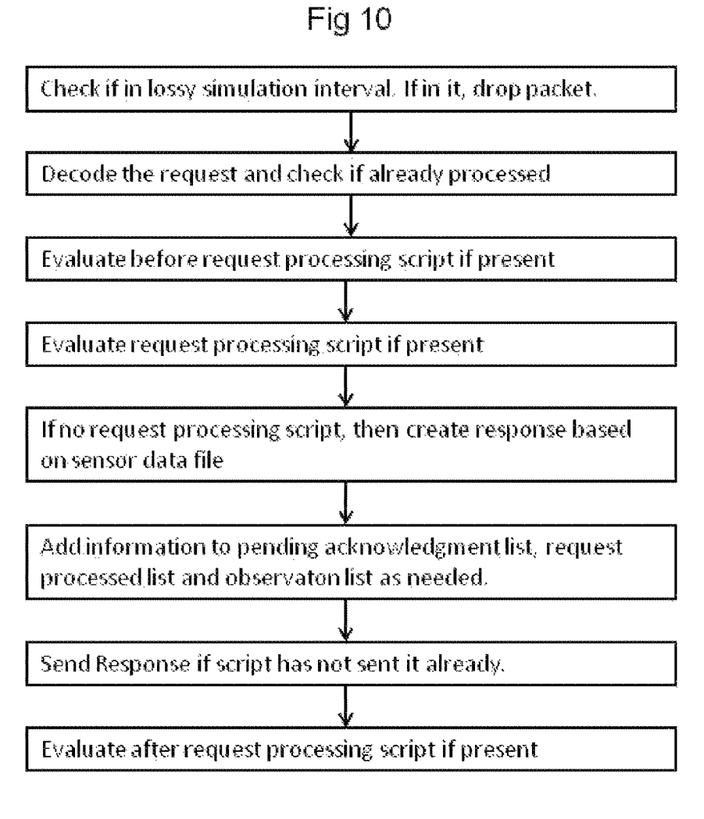
FIG. 10 illustrates Simulation CoAP Server Process Requests Details according to the invention

Referring now to FIG. 10, an overview of an embodiment of the invention that accounts for intermittent connectivity is depicted. Because sensors being simulated are in a constrained networking environment where connectivity comes and goes, a device according to the invention and the simulation has built-in lossy characteristics that can be associated with each sensor. Based on the lossy characteristics associated, random width time bands of non-communication intervals are determined and when packets are received or to be transmitted, a check is made to see if the sensor is in a lossy interval; if it is, the packet is dropped. As per the CoAP protocol specifications, the packet is decoded and processed by using information from the Sensor Modeling File or from the Sensor Data File. If the decoding of the packet is successful, the before request processing script is present for the specified URI and method is evaluated. Then a check is made as to whether a request processing script is present for the specified URI and method. If such a request processing script is found, it is evaluated. If it is not found, the information in the Sensor Data File is used to generate a response. Additions are also made to the "pending acknowledgment list", "request processed list", and "observation list" as needed. If the "after request processing script" for the specified URI and method is present it is then evaluated and the response sent out if not already done by the request processing script.

Figure 11:
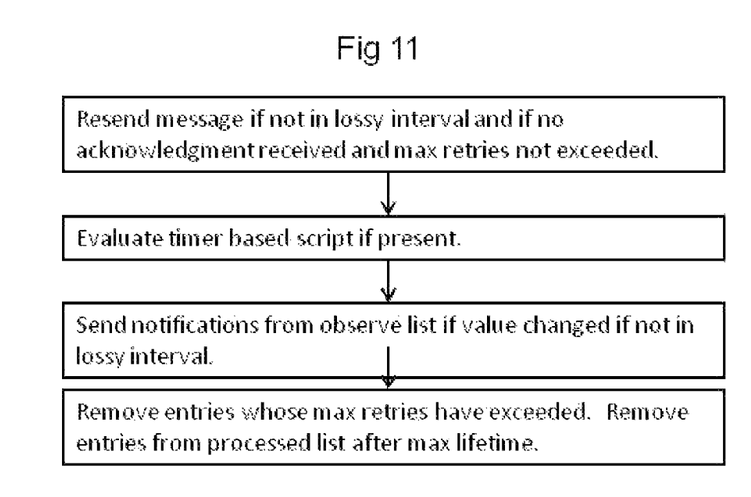
FIG. 11 illustrates Simulation CoAP Server Process Timer Event Details according to the invention

In the case of timer events, a check is made to see if any retransmission of messages is required for those messages for which an acknowledgment is not received. The timer processing script, if present in the Sensor Modeling File, is evaluated. Notifications are sent for those URIs in the observation list whose simulated values have changed. Pending acknowledgment list entries are cleared if the max retries are exceeded. Request processed list entries are cleared after a certain time interval to allow reuse of tokens and message ids. Observation lists are also cleared if no acknowledgment is received, whereas no acknowledgement is interpreted as an indication that the client is no longer interested in getting updates. An overview of this processing is shown in FIG. 11.

It can be appreciated that a device according to the invention has many useful applications. Several are set forth hereinbelow.

A device according to the invention is useful in benchmarking the performance characteristics of gateway hardware devices residing at the edge of the network and talking to multiple sensors. The inventive device is configurable to simulate traffic from <n> sensors, and by varying <n> the behavior of the gateway hardware device is determinable under various <n> values. Scalability testing is useful in determining the upper bounds of the number of sensors with which a gateway hardware device can perform reliably.

In addition to scalability, the inventive device is useful in functional testing of gateway hardware devices. Functional testing improves the robustness of gateways device by improving resiliency in handling error conditions.

Further, it can be appreciated that the inventive device is useful in testing the scalability and functionality of sensor management system software. The invention provides error scenarios as well as simulation of <n> sensors, and <n> may assume large values. Moreover, the invention provides re-creation of real-world scenarios by orchestrating the values returned from different sensors in a coordinated manner.

Other uses include training, sales demonstrations, technical support through replicating or duplicating customer environments, as well as product development of higher level sensor management systems. In all these applications, a benefit is the obviation of the requirement for a large number of actual sensors, as the invention simulates <n> sensors.

We claim:
1. A system useful in constrained networked sensor data collection and management, said system comprising:
   a computing device, with a network connection, said network connection connecting to at least one application, and said computing device including
   i) a central processing unit;
   ii) at least one computer store containing data, said data comprising a) Sensor Data files, containing listing of Uniform Resource Identifiers, URIs, supported by Constrained Application Protocol, CoAP, and associated information; and b) Sensor Modeling files, said files containing Tool command language, Tcl, scripts;

c) computer implementable instructions, said instructions enabling the creation of a plurality of threads, where each said thread simulates at least one sensor, where said sensors run CoAP software, and where said instructions add Internet protocol version 4 and version 6, IPv4/v6, addresses of said sensors to a Transmission Control Protocol/Internet protocol, TCP/IP, stack on said computing device, and where each thread is bound to a protocol specific port; and where each thread contains a Tcl interpreter allowing said Tcl scripts in said Sensor Modeling file to be interpreted so as to change said sensor behavior simulating actual sensor changes over time; and where the computer implementable instructions perform additional steps of evaluating initialization script, receiving requests, timer events or close notification, evaluating closure scripts, and removing said IPv4/v6 addresses and closing each of said plurality of threads;

whereby behavior of a constrained network of a plurality of sensors is obtained, and output to said application, such that said application uses said obtained behavior to modify operation of said application.

2. The system of claim 1, wherein data from actual sensors is received and stored in Sensor Data Files.

3. The system of claim 2, wherein said system sends multi-cast requests, lists sensors that respond, and queries each responding sensor so as to create multiple Sensor Data Files.

4. The system of claim 1 wherein said Sensor Model files provide data sufficient to model errors, intermittent connectivity and lossy behavior.

5. The system of claim 1 wherein said application using said obtained behavior benchmarks performance characteristics of gateway hardware devices residing at the edge of said network and talking to multiple sensors.

6. The system of claim 1 wherein said application using said obtained behavior simulates traffic from <n> sensors, and by varying <n> the behavior of gateway hardware device is determinable under various <n> values, such that scalability testing is useful in determining the upper bounds of the number of sensors with which a gateway hardware device can perform reliably.

7. The system of claim 1 wherein said application using said obtained behavior performs functional testing of gateway hardware devices, improving gateway device robustness by improving resiliency in handling error conditions.

8. The system of claim 1 wherein said application using said obtained behavior tests sensor management system software scalability and functionality.

9. The system of claim 1 wherein said application using said obtained behavior enables any of:

training;

sales demonstrations;

technical support, through replicating or duplicating customer environments or both;

product development of higher level sensor management systems;

any application such that benefit is derived from simulation of <n> sensors.

* * * * *